United States Patent
Kurita et al.

(10) Patent No.: US 10,462,280 B2
(45) Date of Patent: Oct. 29, 2019

(54) DEVICE AND METHOD FOR USING APPROPRIATE TELEPHONE NUMBER FOR CALL CONNECTION

(71) Applicant: NTT DOCOMO, INC., Tokyo (JP)

(72) Inventors: Ryouhei Kurita, Tokyo (JP); Teppei Azuma, Tokyo (JP); Koutarou Nagase, Tokyo (JP); Kazunari Suzuki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 73 days.

(21) Appl. No.: 15/556,460

(22) PCT Filed: Mar. 10, 2016

(86) PCT No.: PCT/JP2016/057593
§ 371 (c)(1),
(2) Date: Sep. 7, 2017

(87) PCT Pub. No.: WO2016/143856
PCT Pub. Date: Sep. 15, 2016

(65) Prior Publication Data
US 2018/0054512 A1    Feb. 22, 2018

(30) Foreign Application Priority Data

Mar. 12, 2015   (JP) .................................. 2015-049291

(51) Int. Cl.
*H04M 3/00*  (2006.01)
*H04M 1/725*  (2006.01)
(Continued)

(52) U.S. Cl.
CPC ......... *H04M 1/72563* (2013.01); *H04M 3/42* (2013.01); *H04M 3/42059* (2013.01);
(Continued)

(58) Field of Classification Search
CPC ............... H04M 3/42; H04M 3/42059; H04M 3/42102; H04M 3/42246; H04M 1/72563; H04W 8/183; H04W 48/18
(Continued)

(56) References Cited

U.S. PATENT DOCUMENTS

2014/0269675 A1* 9/2014 Bugos ................... H04M 7/006
370/352

FOREIGN PATENT DOCUMENTS

EP           1821503 A2     1/2007
JP         2005348233 A    12/2005
(Continued)

OTHER PUBLICATIONS

Partial European Search Report issued in corresponding European Application No. 16761822.2 dated Sep. 20, 2018, 13 pages.
(Continued)

*Primary Examiner* — Huy C Ho
(74) *Attorney, Agent, or Firm* — MKG, LLC

(57) ABSTRACT

A telephone sends, in accordance with a user's instruction, a call connection request that includes a source telephone number and a destination telephone number to a connecting device or VoIP server device that corresponds to the source telephone number. Management server device, upon identifying a set of a source telephone number and a destination telephone number that is more appropriate than a set of those included in the call connection request, sends a notice to the telephone to prompt a user to change the telephone numbers. The connecting device or VoIP server device that establishes a call connection in accordance with the call connection request, notifies a destination telephone of a to-be-notified telephone number that is selected by the management server device based on the destination telephone number.

6 Claims, 7 Drawing Sheets

(51) Int. Cl.
*H04M 3/42* (2006.01)
*H04W 8/18* (2009.01)
*H04W 48/18* (2009.01)

(52) U.S. Cl.
CPC ... *H04M 3/42102* (2013.01); *H04M 3/42246* (2013.01); *H04W 8/183* (2013.01); *H04W 48/18* (2013.01)

(58) Field of Classification Search
USPC ..................................................... 455/435.1
See application file for complete search history.

(56) References Cited

FOREIGN PATENT DOCUMENTS

| JP | 2006121335 A | 5/2006 |
| JP | 2009232414 A | 10/2009 |
| JP | 2013-042455 A | 2/2013 |
| JP | 2007-251332 A | 9/2017 |
| WO | 2014150543 A1 | 9/2014 |

OTHER PUBLICATIONS

Extended European Search Report issued in corresponding European Application No. 16761822.2 dated Jan. 2, 2019, pp. 1-11.
Notification of Reasons for Refusal issued in corresponding Japanese Application No. 2017-505396 dated Jul. 4, 2018, 6 pages.
International Search Report for International Application No. PCT/JP2016/057593, dated May 17, 2016.

* cited by examiner

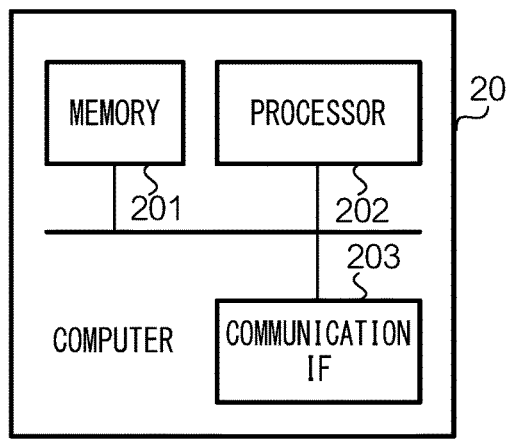
FIG. 3
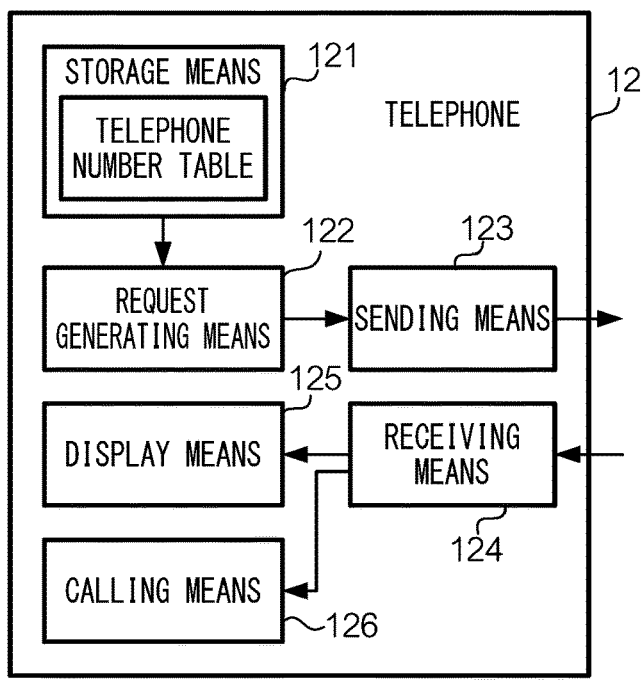
FIG. 4
| TELEPHONE NUMBER | STATUS |
|---|---|
| #A-X | ACTIVE |
| #B-X | INACTIVE |
| #I-X | ACTIVE |
FIG. 5

| MAIN TELEPHONE NUMBER | TELEPHONE NUMBER | STATUS |
|---|---|---|
| #A-X | #A-X | ACTIVE |
| | #B-X | INACTIVE |
| | #I-X | ACTIVE |
| #B-Y | #A-Y | INACTIVE |
| | #B-Y | ACTIVE |
| | #I-Y | ACTIVE |
| ⋮ | ⋮ | ⋮ |

| PRIORITY LEVEL | CONDITION |
|---|---|
| 1 | DESIGNATION TABLE |
| 2 | #I |
| 3 | COUNTRY CODES MATCH |
| ⋮ | ⋮ |

FIG. 8

| PRIORITY LEVEL | CONDITION |
|---|---|
| 1 | DESIGNATION TABLE |
| 2 | COUNTRY CODES MATCH |
| 3 | LATEST CALL |
| ⋮ | ⋮ |

FIG. 9

| PRIORITY LEVEL | CONDITION |
|---|---|
| 1 | LATEST CALL |
| 2 | COUNTRY CODES MATCH |
| 3 | LONGEST ACTIVE TIME |
| ⋮ | ⋮ |

FIG. 10

| MAIN TELEPHONE NUMBER | SOURCE TELEPHONE NUMBER | DESTINATION TELEPHONE NUMBER |
|---|---|---|
| #A-X | #A-X | #C-Z |
|  | #B-X | #B-Y |
|  | ⋮ | ⋮ |
| ⋮ | ⋮ | ⋮ |

FIG. 11

| MAIN TELEPHONE NUMBER | TIME PERIOD | ACTIVE |
|---|---|---|
| #A-X | 2014/12/25 12:23 - | #A-X, #I-X |
| | 2014/12/21 9:54 - 2014/12/24 21:22 | #B-X, #I-X |
| | ⋮ | ⋮ |
| ⋮ | ⋮ | ⋮ |

FIG. 12

| TIME PERIOD | TO-BE-NOTIFIED TELEPHONE NUMBER | SOURCE TELEPHONE NUMBER | DESTINATION TELEPHONE NUMBER |
|---|---|---|---|
| 2014/12/24 23:43 - 2014/12/24 23:51 | #A-X | #B-X | #B-Y |
| 2014/12/24 21:18 - 2014/12/24 21:22 | #A-X | #I-X | #I-Y |
| ⋮ | ⋮ | ⋮ | ⋮ |

FIG. 13

DEVICE AND METHOD FOR USING APPROPRIATE TELEPHONE NUMBER FOR CALL CONNECTION

TECHNICAL FIELD

The present invention relates to a technique for using an appropriate telephone number for a call connection.

BACKGROUND ART

There is known in the art a telephone that can use plural telephone numbers to make or receive a call. For example, in recent years, many mobile phones are equipped with an IC card, referred to as a SIM card (Subscriber Identity Module Card), on which there is recorded a unique ID, IMSI (International Mobile Subscriber Identity), that identifies a telephone number so as to enable the mobile phone to make or receive a call. In a mobile phone equipped with a SIM card, there is read from the SIM card an IMSI that identifies a telephone number assigned to the mobile phone, so as to enable a call to be made or received. On some SIM cards plural IMSIs may be recorded; and a mobile phone including a SIM card on which plural IMSIs are recorded can selectively use the IMSIs to make or receive calls.

In a telephone capable of using plural telephone numbers to make or receive calls, inconvenience is caused if an inappropriate telephone number is selected. Japanese patent document JP 2013-042455 A1 is an example of a document that proposes a technique for eliminating such an inconvenience, by which technique a telephone including a VoIP (Voice over Internet Protocol) function that sends a call via an IP (Internet Protocol) network, notifies a destination telephone of a telephone number as a caller ID that is retrieved from a SIM card, instead of a telephone number of an IP telephone. According to the technique disclosed in Japanese patent document JP 2013-042455 A1, a destination telephone that has received a call made using an IP telephone number receives notification of a telephone number retrieved from a SIM card as a caller ID, so that a user of the destination telephone, who does not know the IP telephone number of the source telephone, can identify a caller of the source telephone.

SUMMARY

When a user makes a call using a telephone that can use plural telephone numbers, a telephone number of the telephone that is to be notified to a destination telephone, hereinafter referred to as "to-be-notified telephone number," is selected depending on circumstances. However, selecting an appropriate to-be-notified telephone number is likely to cause inconvenience to a user of a source telephone.

In addition, when a user makes a call using a telephone that can use plural telephone numbers, a telephone number of the telephone that is to be used to make the call, hereinafter referred to as "calling telephone number," is selected according to circumstances. However, selecting an appropriate calling telephone number may cause inconvenience a user of a source telephone.

In addition, when a user makes a call using a telephone that calls another telephone that can use plural telephone numbers to receive a call, a telephone number of the destination telephone that is to be specified, hereinafter referred to as "destination telephone number," is selected depending on circumstances. Thus, selecting an appropriate destination telephone number to call can present difficulties for a user of a source telephone.

In view of the problems described above, it is an object of the present invention to provide a means that enables a telephone capable of using plural telephone numbers when making or receiving a call, to use an appropriate telephone number when a call connection is established with another telephone.

To solve the problems described above, in an embodiment, the present invention provides a device comprising: an acquiring means that acquires a call connection request that requests a call connection from a source telephone number to a destination telephone number; a selecting means that selects, as a to-be-notified telephone number, one of source telephone numbers that have been assigned to a source telephone that has sent the call connection request, in accordance with a condition relevant to the destination telephone number; and a notification means that notifies a destination telephone that is identified by the destination telephone number, of the to-be-notified telephone number.

In the above device, the selecting means may select the to-be-notified telephone number based on information on a source telephone number that has been used in a call connection request sent by the destination telephone to call the source telephone.

In the above device, the acquiring means may acquire the call connection request from the source telephone, and the selecting means may acquire the source telephone numbers assigned to the source telephone, from the source telephone.

The above device may be the source telephone.

Also, in an embodiment, the present invention provides a device comprising: an acquiring means that acquires a call connection request that requests a call connection from a source telephone number to a destination telephone number; a selecting means that selects, as a calling telephone number, one of source telephone numbers that have been assigned to a source telephone that has sent the call connection request, in accordance with a condition relevant to the destination telephone number; and a notification means that upon detecting that the calling telephone number differs from the source telephone number, notifies the source telephone of the calling telephone number.

Also, in an embodiment, the present invention provides a device comprising: an acquiring means that acquires a destination telephone number; a selecting means that selects, as a calling telephone number, one of source telephone numbers that have been assigned to the device, in accordance with a condition relevant to the destination telephone number; and a sending means that sends a call connection request that requests a call connection from the calling telephone number to the destination telephone number.

Also, in an embodiment, the present invention provides a device comprising: a request acquiring means that acquires a call connection request that requests a call connection from a source telephone number to a destination telephone number; a telephone number acquiring means that selects one of telephone numbers that have been assigned to a destination telephone that is identified by the destination telephone number, the one of the telephone numbers having been available at the time of the acquisition of the call connection request by the request acquiring means; and an instruction means that instructs a connecting device that establishes a call connection between telephones, to establish a call connection from the source telephone number to the selected one of the telephone numbers.

Also, in an embodiment, the present invention provides a device comprising: a request acquiring means that acquires a call connection request that requests a call connection from a source telephone number to a destination telephone number; a telephone number acquiring means that selects at least one of telephone numbers that have been assigned to a destination telephone that is identified by the destination telephone number, the at least one of the telephone numbers having been available at the time of the acquisition of the call connection request by the request acquiring means; and a notification means that upon detecting that the selected at least one of the telephone numbers differs from the destination telephone number, notifies a source telephone that has sent the call connection request, of the selected at least one of the telephone numbers.

The above device may further comprise a selecting means that, in a case where the at least one of the telephone numbers includes telephone numbers, selects an available telephone number in accordance with a condition relevant to the source telephone number, and the notification means may notify the source telephone of the selected available telephone number.

In the above device, the selecting means may perform the selection based on a communication network according to the telephone number.

Also, in an embodiment, the present invention provides a method comprising: acquiring a call connection request that requests a call connection from a source telephone number to a destination telephone number; selecting, as a to-be-notified telephone number, one of source telephone numbers that have been assigned to a source telephone that has sent the call connection request, in accordance with a condition relevant to the destination telephone number; and notifying a destination telephone that is identified by the destination telephone number, of the to-be-notified telephone number.

Also, in an embodiment, the present invention provides a method comprising: acquiring a call connection request that requests a call connection from a source telephone number to a destination telephone number; selecting, as a calling telephone number, one of source telephone numbers that have been assigned to a source telephone that has sent the call connection request, in accordance with a condition relevant to the destination telephone number; and upon detecting that the calling telephone number differs from the source telephone number, notifying the source telephone of the calling telephone number.

Also, in an embodiment, the present invention provides a method comprising: acquiring a call connection request that requests a call connection from a source telephone number to a destination telephone number; selecting one of telephone numbers that have been assigned to a destination telephone that is identified by the destination telephone number, the one of the telephone numbers having been available at the time of the acquisition of the call connection request; and instructing a connecting device that establishes a call connection between telephones, to establish a call connection from the source telephone number to the selected one of the telephone numbers.

Also, in an embodiment, the present invention provides a method comprising: acquiring a call connection request that requests a call connection from a source telephone number to a destination telephone number; selecting at least one of telephone numbers that have been assigned to a destination telephone that is identified by the destination telephone number, the at least one of the telephone numbers having been available at the time of the acquisition of the call connection request; and upon detecting that the selected at least one of telephone numbers differs from the destination telephone number, notifying a source telephone that has sent the call connection request, of the selected at least one of the telephone numbers.

Effects of Embodiments of the Invention

Embodiments of the present invention enable a telephone capable of using plural telephone numbers when making or receiving a call, to use an appropriate telephone number when a call connection is established with another telephone.

BRIEF DESCRIPTION OF THE DRAWINGS

FIG. 3 is a diagram showing a configuration of a computer that is used as hardware of a management server device according to an embodiment.

FIG. 4 is a diagram showing a functional configuration of a telephone according to an embodiment.

FIG. 5 is a diagram showing a data configuration of a telephone number table that is stored in a telephone according to an embodiment.

FIG. 8 is a diagram showing a data configuration of a destination telephone number selection condition table that is stored in a management server device according to an embodiment.

FIG. 9 is a diagram showing a data configuration of a calling telephone number selection condition table that is stored in a management server device according to an embodiment.

FIG. 10 is a diagram showing a data configuration of a to-be-notified telephone number selection condition table that is stored in a management server device according to an embodiment.

FIG. 11 is a diagram showing a data configuration of a specified source-and-destination table that is stored in a management server device according to an embodiment.

FIG. 12 is a diagram showing a data configuration of an active status history table that is stored in a management server device according to an embodiment.

FIG. 13 is a diagram showing a data configuration of a call history table that is stored in a management server device according to an embodiment.

DESCRIPTION OF REFERENCE NUMERALS

1 . . . Call connection system, 9 . . . Internet, 10 . . . Computer, 11 . . . Telephone network, 12 . . . Telephone, 13 . . . Management server device, 20 . . . Computer, 91 . . . VoIP server device, 101 . . . Memory, 102 . . . Processor, 103 . . . Display, 104 . . . Keypad, 105 . . . Card reader, 106 Communication IF, 107 . . . Speaker, 108 . . . Microphone, 111 . . . Connecting device, 121 . . . Storage means, 122 . . . Request generating means, 123 . . . Sending means, 124 . . . Receiving means, 125 . . . Display means, 126 . . . Calling means, 131 . . . Storage means, 132 . . . Request acquiring means, 133 . . . Telephone number acquiring means, 134 . . . Destination telephone number selecting means, 135 Calling telephone number selecting means, 136 . . . Notification means, 137 . . . To-be-notified telephone number selecting means, 138 . . . Instruction means, 201 . . . Memory, 202 . . . Processor, 203 . . . Communication IF

MODES FOR IMPLEMENTING EMBODIMENTS OF THE INVENTION

Figure 1:
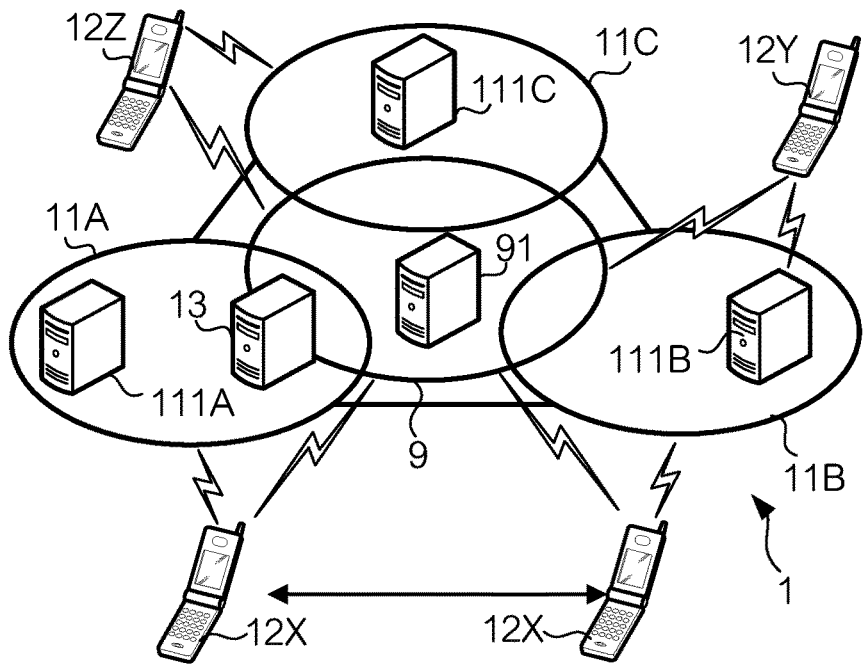
FIG. 1 is a diagram showing a configuration of a call connection system according to an embodiment.

Call connection system 1 according to an embodiment of the present invention is described below. FIG. 1 is a diagram showing an example of a configuration of call connection system 1, according to an embodiment, which includes telephone network 11A, telephone network 11B, and telephone network 11C. It is of note that the number of telephone networks that are included in call connection system 1 is not limited to three. However, in the following description, the telephone networks included in call connection system 1 will be collectively referred to as "telephone network 11."

In the following description, it is assumed that telephone network 11 are each a mobile telephone network. However, in a modification, telephone network 11 may include a fixed-line telephone network. Also, in the following description, it is assumed that each of telephone network 11 can provide a telephone service in a different country. It is assumed that a country in which telephone network 11A provides a telephone service is country A, a country in which telephone network 11B provides a telephone service is country B, and a country in which telephone network 11C provides a telephone service is country C. However, in a modification, telephone network 11 may provide a telephone service in the same country or area, or telephone network 11 may provide a telephone service in an area covering plural countries. Each telephone network 11 is partially interconnected, so as to provide a roaming service.

Each telephone network 11 includes a connecting device that performs a call connection between telephones. For example, telephone network 11A includes connecting device 111A, telephone network 11B includes connecting device 111B, and telephone network 11C includes connecting device 111C. In the following description, the connecting devices will be collectively referred to as "connecting device 111." Connecting device 111 is, for example, a switching machine included in telephone network 11 or a collection of machines including a switching machine.

Each telephone network 11 is connected to Internet 9, which includes VoIP server device 91 that performs a call connection between telephones, using a VoIP.

Call connection system 1 includes telephones to be used by a user, namely, telephone 12X, telephone 12Y, and telephone 12Z. It is of note that the number of telephones that are included in call connection system 1 is not limited to three. Call connection system 1 may include numerous telephones, depending on a number of users of the system.

In the following description, the telephones included in call connection system 1 will be collectively referred to as "telephone 12."

In the following description, it is assumed that each telephone 12 is a mobile phone; however, in a modification, telephone 12 may include a fixed-line telephone. As shown in FIG. 1, for example, telephone 12X, which is a mobile phone, may connect to either telephone network 11A or telephone network 11B. As is the case with telephone 12X, one or more of telephone 12 may connect to one or more of plural telephone network 11. On the other hand, one or more of telephone 12 may connect to Internet 9 through telephone network 11, or through a network other than telephone network 11.

Call connection system 1 includes management server device 13 that manages telephone numbers, which are used for a call connection. Management server device 13 is connected to telephone network 11A and Internet 9.

Telephone network 11 and Internet 9 are similar to conventional telephone networks, and also to the conventional Internet. As such, description of configurations of the networks will be omitted. Connecting devices 111 and VoIP server device 91 are similar to conventional connecting devices and a conventional VoIP server device except that connecting device 111 and VoIP server device 91 each perform characteristic data exchange with telephone 12 and management server device 13 (each of which will be described later). Accordingly, description of configurations of the devices will be omitted. In the following, there will be described configurations of telephone 12 and management server device 13, and also an operation of call connection system 1.

Figure 2:
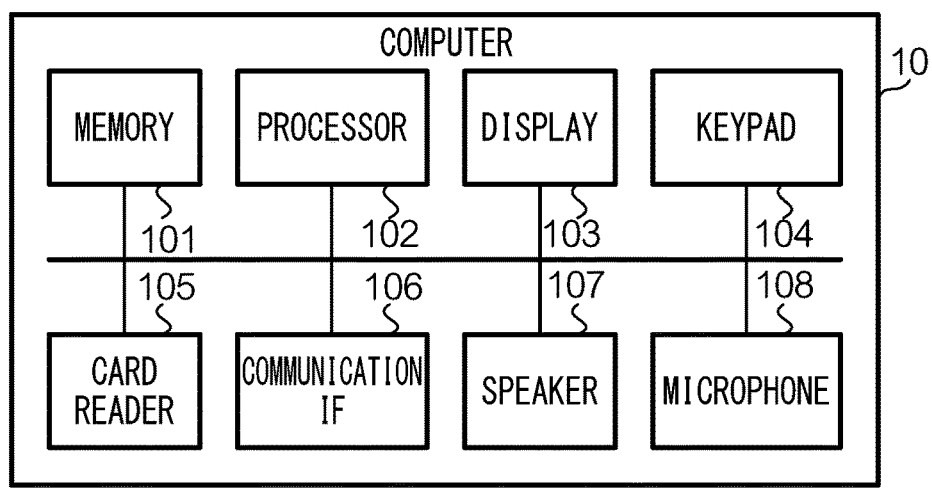
FIG. 2 is a diagram showing a configuration of a computer that is used as hardware of a telephone according to an embodiment.

Telephone 12 includes hardware that is similar to that of a commonly used computer having a calling function. FIG. 2 is a diagram showing a configuration of computer 10 that is used as hardware of telephone 12, according to an embodiment. Computer 10 includes memory 101 that stores various types of data, processor 102 that carries out data processing in accordance with a program stored in memory 101, display 103 that displays various types of information for a user, keypad 104 that accepts a user's input operation, card reader 105 that reads data from a SIM card, communication IF 106 that is an IF (interface) capable of performing data communication with telephone network 11 and Internet 9, speaker 107 that outputs a sound such as voice speech to a user, and microphone 108 that collects voice speech of a user. It is of note that keypad 104 is an example of an input device that accepts a user's input operation; for example, computer 10 may include another type of input device such as a touch panel that is combined with display 103 to form a touch display.

Management server device 13 includes hardware that is similar to that of a computer that is commonly used as a server device. FIG. 3 is a diagram showing a configuration of computer 20 that is used as hardware of management server device 13, according to an embodiment. Computer 20 includes memory 201 that stores various types of data, processor 202 that carries out data processing in accordance with a program stored in memory 201, and communication IF 203 that performs data communication with telephone network 11A and Internet 9.

FIG. 4 is a diagram showing a functional configuration of telephone 12, according to an embodiment. Computer 10 functions as a device including the configuration shown in FIG. 4, by carrying out a processing in accordance with a program for telephone 12 according to the present embodiment. The functional configuration of telephone 12 will be described below.

Storage means 121 stores various types of data, including a telephone number table that is used to manage a current status of each telephone number that has been assigned to telephone 12. FIG. 5 is a diagram showing a data configuration of the telephone number table stored in storage means 121, according to an embodiment, which includes a record for each of the telephone numbers assigned to telephone 12, which record includes a [telephone number] field in which data on a telephone number is stored, and a [status] field in which data indicative of whether a telephone number is currently active is stored. In the following description, the expression [(field name)] refers to a field that is identified by the field name.

In a [status] field, data "active" indicates that a telephone number is available for making or receiving a call; whereas data "inactive" indicates that a telephone number is unavailable.

The telephone numbers assigned to telephone 12 include a telephone number that is used to make or receive calls through telephone network 11, which telephone number will hereinafter be referred to as "mobile telephone number"; and also a telephone number that is used to make or receive calls through Internet 9, which telephone number will hereinafter be referred to as "IP telephone number."

A mobile telephone number is a telephone number that is identified by a unique ID (IMSI) recorded on a SIM card. In a case where plural unique IDs are recorded on a SIM card, telephone 12 may, at one time, activate only one of mobile telephone numbers identified by the unique IDs. In other words, telephone 12 activates a mobile telephone number that may be selected, for example, based on a user's input operation, while inactivating other mobile telephone numbers.

An IP telephone number is recorded in storage means 121 as, for example, data to be used with a program for making or receiving a call using a VoIP. Typically, a single IP telephone number is recorded in storage means 121. However, telephone 12, to which two or more IP telephone numbers have been assigned, may, at one time, activate only one of the IP telephone numbers, as is the case with a mobile telephone number. In other words, telephone 12 activates an IP telephone number that may be selected, for example, based on a user's input operation, while inactivating other IP telephone numbers.

As described above, plural mobile telephone numbers are selectively used, and plural IP telephone numbers are selectively used. However, a mobile telephone number and an IP telephone number may be simultaneously used. In other words, a mobile telephone number and an IP telephone number may be simultaneously activated.

In the following description, a mobile telephone number that has been assigned to telephone 12X for use in telephone network 11A will be referred to as "#A-X," using reference symbols of the telephone network and the telephone, as shown in FIG. 5. A mobile telephone number that has been assigned to telephone 12X for use in telephone network 11B will be referred to as "#B-X," using reference symbols of the telephone network and the telephone. An IP telephone number that has been assigned to telephone 12X will be referred to as "#I-X," using a reference symbol corresponding to Internet 9 and a reference symbol of the telephone.

In the following description, it is assumed that telephone 12X includes a SIM card on which there are recorded a unique ID for use in telephone network 11A and a unique ID for use in telephone network 11B, as shown in FIG. 5, so that the telephone may use two mobile telephone numbers corresponding to the unique IDs, and an IP telephone number.

Remaining functions of telephone 12 will now be described with reference to FIG. 4. Request generating means 122 generates a call connection request based on a user's calling operation, in which operation a user specifies from among active telephone numbers a calling telephone number to be used. Such a telephone number will hereinafter be referred to as "source telephone number." This telephone number specifies a telephone number of telephone 12 to be called. Such a telephone number will hereinafter be referred to as "destination telephone number." Request generating means 122 generates a call connection request directed from the source telephone number specified by the user's calling operation to the destination telephone number specified by the same operation.

Sending means 123 sends a call connection request generated by request generating means 122 to connecting device 111 or VoIP server device 91. Specifically, sending means 123, upon detecting that a source telephone number is a mobile telephone number, sends a call connection request to connecting device 111 of telephone network 11 that corresponds to the mobile telephone number; whereas the sending means, upon detecting that a source telephone number is an IP telephone number, sends a call connection request to VoIP server device 91.

Receiving means 124 receives a response to a call connection request sent by sending means 123, which response is, for example, one of: a notice that prompts a user to change a source telephone number or a destination telephone number, which notice will hereinafter be referred to as "change notice"; a notice of failure of a call connection, which will hereinafter be referred to as "failure notice"; and a notice of success of a call connection, which will hereinafter be referred to as "success notice."

Display means 125, after receiving means 124 receives a change notice or a failure notice, displays a message according to the received notice, examples of which are described below.

"It is recommended that a source telephone number be changed to #B-X. Do you want to change the source telephone number? (Yes/No)"

"It is recommended that a destination telephone number be changed to #A-Y. Do you want to change the destination telephone number? (Yes/No)"

"It is recommended that a call be made using a VoIP (source telephone number: #I-X, destination telephone number: #I-Y). Do you want to call using the VoIP application? (Yes/No)"

Calling means 126, after receiving means 124 receives a success notice, exchanges voice data with called telephone 12 through a communication connection that has been established by connecting device 111 or VoIP server device 91.

Figures 6, 7:
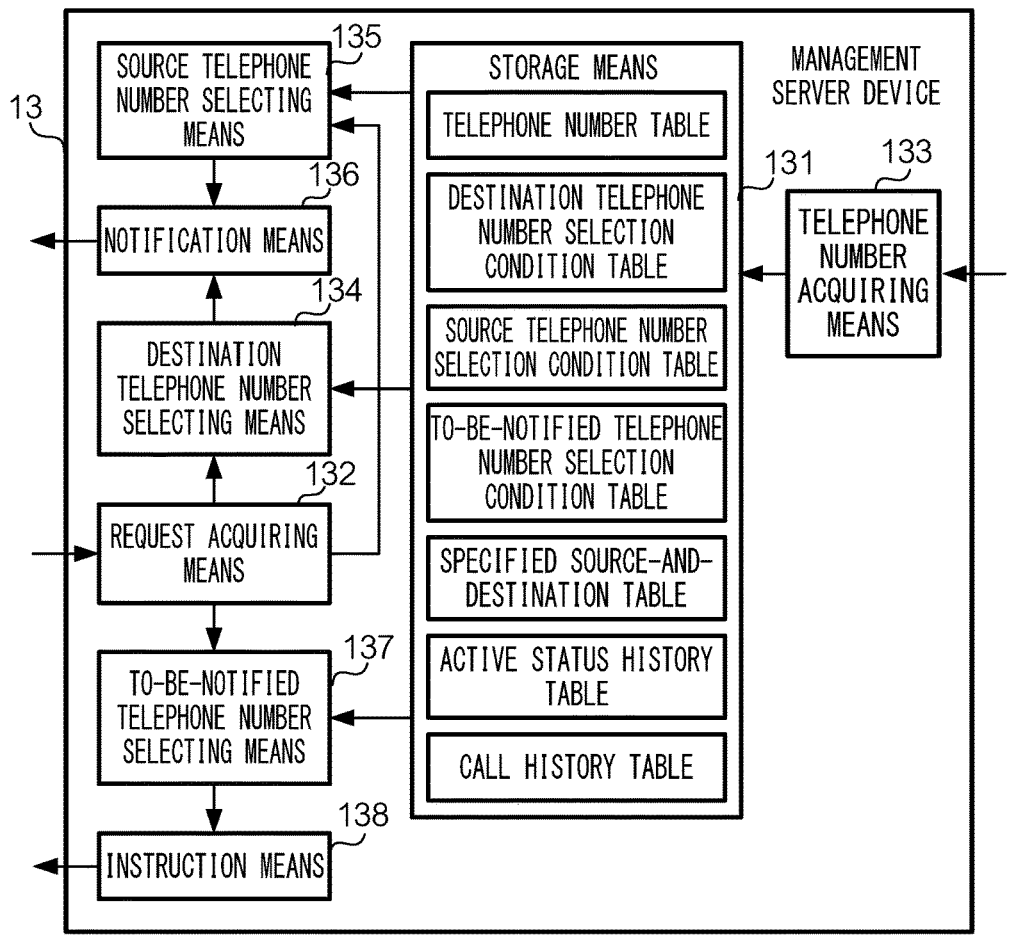
FIG. 6 is a diagram showing a functional configuration of a management server device according to an embodiment.
FIG. 7 is a diagram showing a data configuration of a telephone number table that is stored in a management server device according to an embodiment.

FIG. 6 is a diagram showing a functional configuration of management server device 13, according to an embodiment. Computer 20 functions as a device including the configuration shown in FIG. 6, by carrying out a processing in accordance with a program for management server device 13 according to the present embodiment. The functional configuration of management server device 13 will be described below.

Storage means 131 stores various types of data, including a telephone number table, a destination telephone number selection condition table, a calling telephone number selection condition table, a to-be-notified telephone number selection condition table, a specified source-and-destination table, an active status history table, and a call history table.

FIG. 7 is a diagram showing a data configuration of the telephone number table stored in storage means 131, according to an embodiment, which includes a record for each telephone number assigned to telephone 12, which record includes a [main telephone number] field in which data on a telephone number that identifies telephone number 12 is stored, a [telephone number] field in which data on a telephone number assigned to telephone 12 is stored, and a [status] field in which data indicative of whether a telephone number is currently active is stored.

A main telephone number is one of telephone numbers assigned to telephone 12. It is of note that in a modification, telephone 12 may be assigned a telephone ID that is a unique ID different from a telephone number, in which case, the telephone number table may include a [telephone ID] field in which a telephone ID is stored, instead of including a [main telephone number] field.

It is also of note that the telephone number table stored in storage means 131 need not retain the latest information on each telephone 12. Management server device 13, after receiving a call connection request sent from telephone 12, identifies statuses of telephone numbers assigned to telephones 12 and which are identified by a source telephone number and a destination telephone number included in the received call connection request, as a result of which the management server device can update the telephone number table, as described below.

FIG. 8 is a diagram showing a data configuration of the destination telephone number selection condition table stored in storage means 131, according to an embodiment, which is a table that stores data on conditions used to determine selection of a destination telephone number according to a source telephone number specified by a call connection request. The destination telephone number selection condition table includes a record for each condition, which includes a [priority level] field in which data on a priority level assigned to a condition is stored, and a [condition] field in which data on a condition is stored.

A condition "designation table," shown in FIG. 8, refers to a condition that in a case where, in the specified source-and-destination table, a destination telephone number according to a source telephone number is specified, and the destination telephone number is active, the destination telephone number is selected as a destination telephone number.

A condition "#I," shown in FIG. 8, refers to a condition that a telephone number beginning with a symbol "#I," namely an IP telephone number, is selected as a destination telephone number, regardless of a source telephone number.

A condition "country codes match," shown in FIG. 8, refers to a condition that a destination telephone number, which shares a country code with a source telephone number, and is active, is selected as a destination telephone number. It is of note that a country code is, for example, a letter "A" following the symbol "#" included in telephone number "#A-X." In the present embodiment, a letter following the symbol "#" identifies a country, since each telephone network 11 provides a telephone service in a different country. It is of note that in a modification where telephone network 11 provides a telephone service in the same country or area, a country code may be replaced with communication network identification information that identifies a communication network, telephone network 11 or Internet 9, according to a telephone number.

FIG. 9 is a diagram showing a data configuration of the calling telephone number selection condition table stored in storage means 131, according to an embodiment, which includes a data configuration similar to that of the destination telephone number selection condition table shown in FIG. 8 except that in a [condition] field of the calling telephone number selection condition table, data on a condition is stored, based on which a calling telephone number is selected according to a destination telephone number specified by a call connection request.

A condition "designation table," shown in FIG. 9, refers to a condition in which in the specified source-and-destination table, a source telephone number according to a destination telephone number is specified, and the source telephone number is selected as a calling telephone number.

A condition "country codes match," shown in FIG. 9, refers to a condition in which a source telephone number, which shares a country code with a destination telephone number, is selected as a calling telephone number.

A condition "latest call," shown in FIG. 9, refers to a condition in which a telephone number that has been used to make a latest call to telephone 12 corresponding to a destination telephone number, and that is active, is selected as a calling telephone number.

FIG. 10 is a diagram showing a data configuration of the to-be-notified telephone number selection condition table stored in storage means 131, according to an embodiment, which includes a data configuration similar to that of the destination telephone number selection condition table shown in FIG. 8 except that in a [condition] field of the to-be-notified telephone number selection condition table, data is stored on a condition used to determine selection of a to-be-notified telephone number according to a destination telephone number specified by a call connection request.

A condition "latest call," shown in FIG. 10, refers to a condition that a telephone number that, during a latest call made to telephone 12 that corresponds to a destination telephone number, has been notified to the telephone is selected as a source telephone number.

A condition "country codes match," shown in FIG. 10, refers to a condition in which a source telephone number that shares a country code with a destination telephone number is selected as a to-be-notified telephone number.

A condition "longest active time," shown in FIG. 10, refers to a condition in which a source telephone number that has been active for a longest period of time in a past prescribed time period is selected as a to-be-notified telephone number.

It is of note that the conditions shown in FIGS. 8 to 10 are merely examples, and any other condition may be employed, such as a condition that a telephone number that has been used most frequently in a past prescribed time period is selected. It is also of note that conditions may change depending on, for example, a time of day or communication condition when a call connection request is made.

FIG. 11 is a diagram showing a data configuration of the specified source-and-destination table stored in storage means 131, according to an embodiment, which is a table in which there is stored data on sets of a calling telephone number and a destination telephone number that have been specified by a user of telephone 12. The specified source-and-destination table includes a record for each of sets of a calling telephone number and a destination telephone number, which record includes a [main telephone number] field in which data on a main telephone number identifying telephone 12 used by a user who has specified a set of telephone numbers is stored, a [calling telephone number] field in which data on a calling telephone number specified by a user is stored, and a [destination telephone number] field in which data on a destination telephone number specified by a user is stored.

FIG. 12 is a diagram showing a data configuration of an active status history table stored in storage means 131, the history table being a table that accumulates data stored in the telephone number table shown in FIG. 7. The active status history table includes records that include fields of a [main telephone number] field in which data on a main telephone number identifying telephone 12 is stored, a [time period] field in which data indicative of a time period during which an active or inactive status has remained the same is stored, and an [active] field in which telephone numbers assigned to telephone 12 that have been active is stored.

FIG. 13 is a diagram showing a data configuration of the call history table stored in storage means 131, according to an embodiment, which is a table that stores data on a history of calls made by telephone 12 to another telephone 12. The call history table includes a record for each call made, which record includes fields of [time period] in which data on a time period during which a call has been maintained is stored, [to-be-notified telephone number] in which data on a telephone number that, during a call, has been reported to called telephone 12 is stored, [calling telephone number] in which data on a telephone number that has been used to make a call is stored, and [destination telephone number] in which data on a telephone number of a call destination is stored.

Now, remaining functions of management server device 13 will be described with reference to FIG. 6. Request acquiring means 132 receives a call connection request from telephone network 11 or VoIP server device 91, which has been sent from telephone 12 to the telephone network or the VoIP server device.

Telephone number acquiring means 133, after request acquiring means 132 acquires a call connection request, identifies telephone numbers assigned to telephone 12 that is identified by a source telephone number included in the call connection request, and a status (active or inactive) of each of the telephone numbers. In addition, telephone number acquiring means 133 identifies telephone numbers assigned to telephone 12 that is identified by a destination telephone number included in the call connection request, and a status (active or inactive) of each of the telephone numbers. After identifying the items of data, telephone number acquiring means 133 updates the telephone number table shown in FIG. 7, based on the identified items of data.

Destination telephone number selecting means 134, after request acquiring means 132 receives a call connection request, selects a destination telephone number according to a source telephone number included in the call connection request, in accordance with a condition recorded in the destination telephone number selection condition table shown in FIG. 8. For example, destination telephone number selecting means 134 selects a telephone number from available telephone numbers in accordance with a condition of a source telephone number. In another example, destination telephone number selecting means 134 selects a destination telephone number based on a communication network corresponding to a telephone number.

Calling telephone number selecting means 135, after request acquiring means 132 receives a call connection request, selects, as a calling telephone number, a source telephone number according to a destination telephone number included in the call connection request, in accordance with a condition recorded in the calling telephone number selection condition table shown in FIG. 9.

Notification means 136 sends a change notice to telephone 12 that has sent a call connection request, upon detecting that a destination telephone number selected by destination telephone number selecting means 134 differs from a destination telephone number included in the call connection request, or that a calling telephone number selected by calling telephone number selecting means 135 differs from a source telephone number included in the call connection request.

To-be-notified telephone number selecting means 137, after request acquiring means 132 receives a call connection request, selects, as a to-be-notified telephone number, a source telephone number according to a destination telephone number included in the call connection request, in accordance with a condition recorded in the to-be-notified telephone number selection condition table shown in FIG. 10. For example, to-be-notified telephone number selecting means 137 selects a to-be-notified telephone number based on information on a source telephone number that has been used in a call connection request that has been sent by telephone 12 that is identified by the destination telephone number to call source telephone 12. In another example, to-be-notified telephone number selecting means 137 selects a to-be-notified telephone number based on a communication network corresponding to a telephone number. In addition, to-be-notified telephone number selecting means 137 acquires source telephone numbers that have been assigned to source telephone 12, from the source telephone.

It is of note that destination telephone number selecting means 134, calling telephone number selecting means 135, and to-be-notified telephone number selecting means 137 may select a telephone number by referring to the telephone number table shown in FIG. 7, the specified source-and-destination table shown in FIG. 11, the active status history table shown in FIG. 12, and the call history table shown in FIG. 13.

Instruction means 138, after request acquiring means 132 receives a call connection request, instructs connecting device 111 or VoIP server device 91 that corresponds to a source telephone number included in the call connection request, to establish a call connection according to the call connection request. In addition, instruction means 138 notifies the connecting device or the VoIP server device of a to-be-notified telephone number that has been selected by to-be-notified telephone number selecting means 137.

Connecting device 111 or VoIP server device 91 tries to establish a call connection from a source telephone number included in a call connection request to a destination telephone number included in the same request, in accordance with an instruction sent from instruction means 138. When doing so, connecting device 111 or VoIP server device 91 notifies a destination telephone 12 of a to-be-notified telephone number as a source telephone number that has been notified from instruction means 138, instead of a source telephone number included in the call connection request. Next, if connecting device 111 or VoIP server device 91 succeeds in establishing a communication connection for calling, the connecting device or the VoIP server device sends a success notice to telephone 12 that has sent a call connection request. On the other hand, if connecting device 111 or VoIP server device 91 fails to establish a communication connection for calling, the connecting device or the VoIP server device sends a failure notice to telephone 12 that has sent a call connection request.

Figure 14:
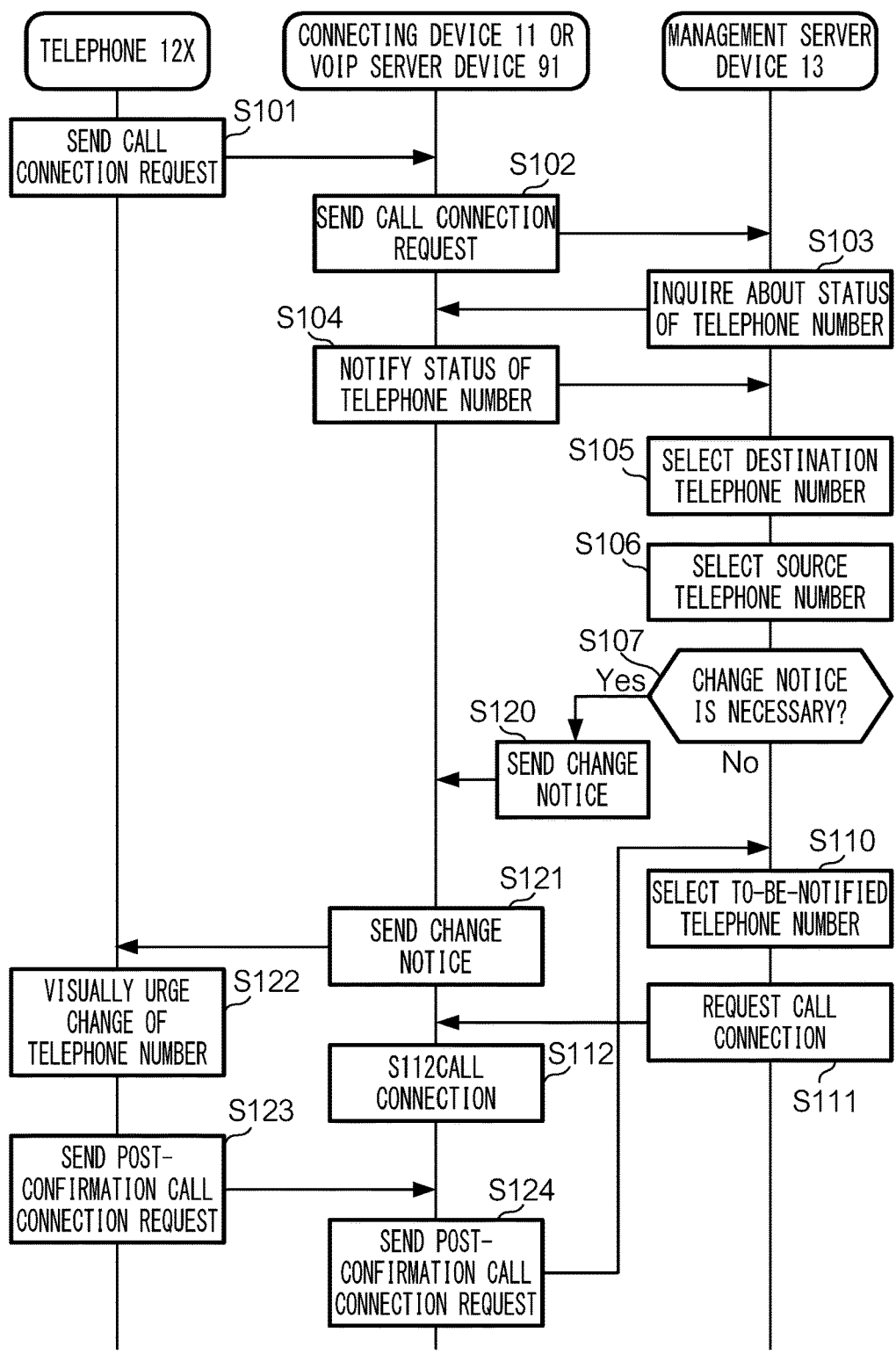
FIG. 14 is a diagram showing a sequence of operation that is performed by a call connection system according to an embodiment based on a call connection request.

FIG. 14 is a diagram showing a sequence of operation performed by call connection system 1, according to an embodiment, in which telephone 12X requests a call connection to telephone 12Y.

A user of telephone 12X who wishes to make a call to telephone 12Y selects a mobile telephone number or IP telephone number of telephone 12Y from, for example, a telephone number list shown in a telephone book screen, and performs a calling operation.

In response to the user's calling operation, telephone 12X refers to the telephone number table shown in FIG. 5 to select an active mobile telephone number of telephone 12X as a source telephone number, if the user's selected destination telephone number is a mobile telephone number, or to select an active IP telephone number of telephone 12X as a source telephone number, if the user's selected destination telephone number is an IP telephone number. Subsequently, telephone 12X generates a call connection request including the source telephone number and the destination telephone number to send the request to connecting device 111 or VoIP server device 91 that corresponds to the source telephone number (step S101).

Now, a case in which the user has selected a mobile telephone number of telephone 12Y as a destination telephone number is considered. In such a case, if the user of telephone 12X exists in country A, mobile telephone number "#A-X" has been selected as being active; accordingly, telephone 12X sends the call connection request to connecting device 111A at step S101. If the user of telephone 12X exists in country B, mobile telephone number "#B-X" has been selected as being active; accordingly, telephone 12X sends the call connection request to connecting device 111B at step S101.

If the user of telephone 12X exists in country C, and the user can use telephone network 11A and telephone network 11C using a roaming service, mobile telephone number "#A-X" can be selected as being active. If the user can use telephone network 11B and telephone network 11C using a roaming service, mobile telephone number "#B-X" can be selected as being active. Assuming that mobile telephone number "#A-X" has been selected, telephone 12X, at step S101, connects to telephone network 11A via telephone network 11C to send a call connection request to connecting device 111A.

On the other hand, in a case where the user has selected an IP telephone number of telephone 12Y as a destination telephone number, telephone 12X sends the call connection request to VoIP server device 91 at step S101.

Connecting device 111 or VoIP server device 91 that has received the call connection request, sends the request to management server device 13 (step S102). Management server device 13 that has received the call connection request refers to the telephone number table shown in FIG. 7 to identify telephone numbers assigned to telephone 12Y that is identified by the destination telephone number included in the call connection request, and inquires of connecting devices 111 and VoIP server device 91 that correspond to the identified telephone numbers about statuses (active or inactive) of the telephone numbers (step S103). Connecting devices 111 and VoIP server device 91 that have received the inquiry notify management server device 13 of statuses of the telephone numbers (step S104). Management server device 13 that has received the notifications updates the telephone number table shown in FIG. 7 based on the notifications.

Subsequently, management server device 13 refers to tables including the destination telephone number selection condition table shown in FIG. 8 to select a destination telephone number according to the source telephone number included in the call connection request (step S105). Subsequently, management server device 13 refers to tables including the source telephone number selection condition table shown in FIG. 9 to select a source telephone number according to the destination telephone number selected at step S105, as a calling telephone number (step S106).

Subsequently, management server device 13 determines whether a set of the calling telephone number selected at step S106 and the destination telephone number selected at step S105 differs from the set of the source telephone number and the destination telephone number included in the call connection request, to determine whether to send a change notice (step S107).

At step S107, if it is determined that the sets of telephone numbers match each other; therefore, it is not necessary to send a change notice (step S107; "No"), management server device 13 refers to the to-be-notified telephone number selection condition table shown in FIG. 10 to select a to-be-notified telephone number according to the destination telephone number included in the call connection request (step S110).

Subsequently, management server device 13 sends the call connection request, together with the to-be-notified telephone number selected at step S110, to connecting device 111 or VoIP server device 91 that corresponds to the source telephone number included in the call connection request, to instruct the connecting device or the VoIP server device to establish a call connection according to the call connection request (step S111). Connecting device 111 or VoIP server device 91 that has received the instruction to establish a call connection, establishes a call connection in accordance with the instruction (step S112). When doing so, connecting device 111 or VoIP server device 91 notifies the called telephone 12Y of the to-be-notified telephone number, as a source telephone number, received from management server device 13 at step S111.

At step S107, if management server device 13 determines that the sets of telephone numbers do not match each other; therefore, it is necessary to send a change notice (step S107; "Yes"), the management server device sends a change notice including the calling telephone number selected at step S106 and the destination telephone number selected at step S105 to connecting device 111 or VoIP server device 91 that corresponds to the source telephone number included in the call connection request (step S120). Connecting device 111 or VoIP server device 91 that has received the change notice sends a change notice to telephone 12X (step S121). In addition, connecting device 111 or VoIP server device 91 discards the call connection request received from telephone 12X at step S102.

Telephone 12X that has received the change notice, displays a message that prompts the user to change one or both of the source telephone number and the destination telephone number (step S122). The user who has seen the message displayed on telephone 12X determines whether to change the telephone numbers, and performs an input operation based on a result of the determination. Telephone 12X that has accepted the user's input operation, generates a new call connection request, which will hereinafter be referred to as "post-confirmation call connection request," to send the request to connecting device 111 or VoIP server device 91 that corresponds to a source telephone number included in the request (step S123). Connecting device 111 or VoIP server device 91 that has received the post-confirmation call connection request, sends the request to management server device 13 (step S124).

Management server device 13 that has received the post-confirmation call connection request, performs steps S110 to S111 based on the request, so that connecting device 111 or VoIP server device 91 that corresponds to the source telephone number included in the request, establishes a call connection according to the request (step S112). When establishing the call connection, connecting device 111 or VoIP server device 91 notifies the called telephone 12Y of a to-be-notified telephone number, as a source telephone number, that is received from management server device 13 at step S111.

Now, concrete examples of a method in which a destination telephone number, a calling telephone number, and a to-be-notified telephone number are selected in call connection system 1 will be described below. In the following description, it is assumed that contents of tables such as the destination telephone number selection condition table that are referred to by management server device 13 to select the telephone numbers conform to examples shown in FIGS. 8 to 13.

Figure 15:
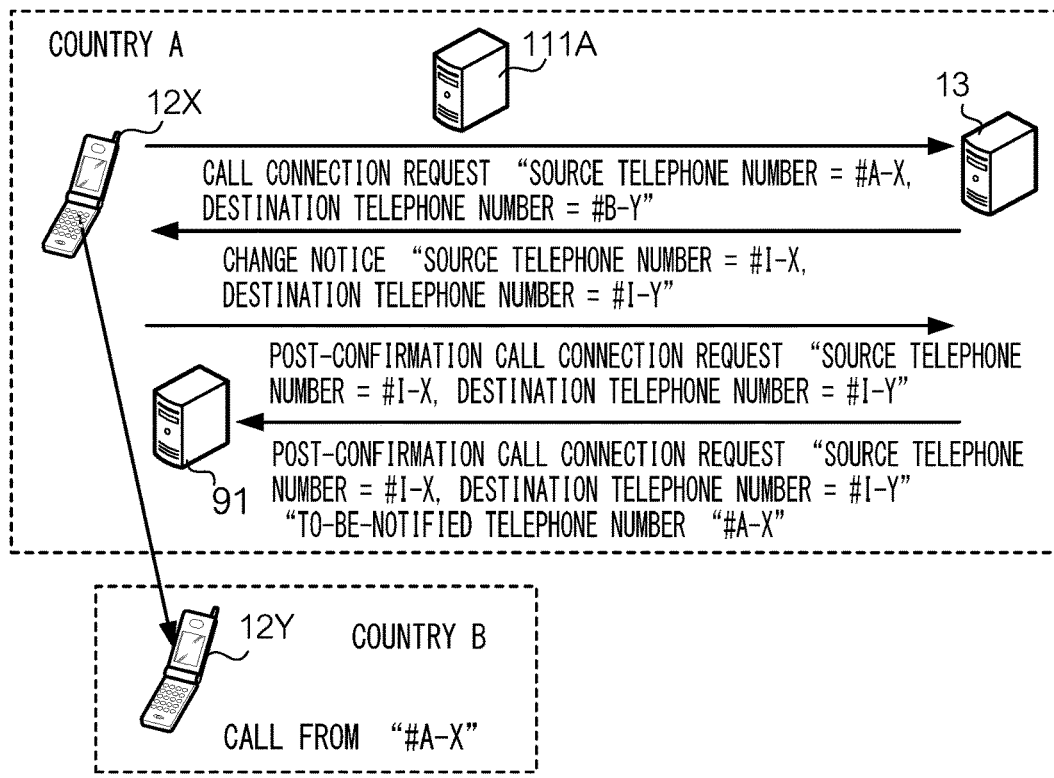
FIG. 15 is a diagram showing how a telephone number used in a call connection system according to an embodiment is changed.

FIG. 15 is a diagram showing an exemplary operation performed by call connection system 1, according to an embodiment, in which a user of telephone 12X located in country A calls telephone 12Y. In the exemplary operation shown in FIG. 15, it is assumed telephone numbers #A-X and #I-X that have been assigned to telephone 12X are active, whereas telephone number #B-X that has been assigned to telephone 12X is inactive. In addition, it is assumed that a user of telephone 12Y is located in country B, and that telephone numbers #B-Y and #I-Y that have been assigned to telephone 12Y are active, whereas telephone number #A-Y that has been assigned to telephone 12Y is inactive.

In the exemplary operation shown in FIG. 15, a user of telephone 12X performs an input operation to call from telephone number #A-X to telephone number "#B-Y, so that the telephone sends a call connection request including information "calling telephone number=#A-X, destination telephone number=#B-Y" to management server device 13 via connecting device 111A. Management server device 13 that has received the call connection request, refers to tables including the destination telephone number selection condition table shown in FIG. 8, to select a destination telephone number according to the calling telephone number included in the call connection request. In the present exemplary operation, since in the designation shown in FIG. 11, a data set including a telephone number of telephone 12X as a calling telephone number, and a telephone number of telephone 12Y as a destination telephone number, is not registered, management server device 13 conforms to second priority condition "#1" included in the destination telephone number selection condition table, so that the management server device selects telephone number "#I-Y" as a destination telephone number.

Subsequently, management server device 13 refers to tables including the calling telephone number selection condition table shown in FIG. 9, to select a calling telephone number according to the selected destination telephone number "#I-Y" In the present exemplary operation, management server device 13 conforms to second priority condition "country codes match" included in the calling telephone number selection condition table, so that the management server device selects telephone number "#I-X" as a calling telephone number. Management server device 13, in response to the call connection request received from telephone 12X, including information "calling telephone number=#A-X, destination telephone number=#B-Y," sends a change notice including information "calling telephone number=#I-X, destination telephone number=#I-Y" to telephone 12X via connecting device 111A.

Telephone 12X that has received the change notice, displays a notice that prompts the user to change the calling telephone number to "#I-X," and to change the destination telephone number to "#I-Y" If the user performs an input operation to agree to the suggestion (for example, by pressing an "OK" button), telephone 12X sends a post-confirmation call connection request including information "calling telephone number=#I-X, destination telephone number=#I-Y" to management server device 13 via, for example, VoIP server device 91. On the other hand, if the user performs an input operation to disagree with the suggestion (for example, pressing a "Cancel" button), telephone 12X sends a post-confirmation call connection request including information "calling telephone number=#A-X, destination telephone number=#B-Y" to management server device 13 via, for example, connecting device 111A.

In the following description of an exemplary operation performed by management server device 13, it is assumed that the user has agreed to the suggestion so that telephone 12X has sent a post-confirmation call connection request including information "calling telephone number=#I-X, destination telephone number=#I-Y" to the management server device. Management server device 13 refers to tables including the to-be-notified telephone number selection condition table shown in FIG. 10, to select a to-be-notified telephone number according to destination telephone number "#I-Y" specified in the post-confirmation call connection request. In the present exemplary operation, management server device 13 conforms to first priority condition "latest call" included in the to-be-notified telephone number selection condition table, so that the management server device selects to-be-notified telephone number "#A-X" recorded in the call history table shown in FIG. 13 that has been notified from telephone 12X to telephone 12Y at the latest call.

Subsequently, management server device 13 sends the post-confirmation call connection request including information "calling telephone number=#I-X, destination telephone number=#I-Y" to VoIP server device 91. In addition, management server device 13 notifies VoIP server device 91 of the to-be-notified telephone number "#A-X." VoIP server device 91 that has received the post-confirmation call connection request, establishes a call connection from calling telephone number "#I-X" to destination telephone number "I-Y" in accordance with the request. In doing so, VoIP server device 91 notifies the called telephone 12Y of to-be-notified telephone number "#A-X" as a source telephone number, instead of calling telephone number "#I-X" that is actually being used.

As described in the foregoing, in the exemplary operation shown in FIG. 15, calling telephone number "#I-X" is used, instead of "#A-X" that the user of telephone 12X has tried to use, and destination telephone number "#I-Y" is used, instead of "#B-Y" that the user has tried to use. In addition, the called telephone 12Y is notified calling telephone number "#A-X," instead of "#I-X" that has actually been used to call.

Figure 16:
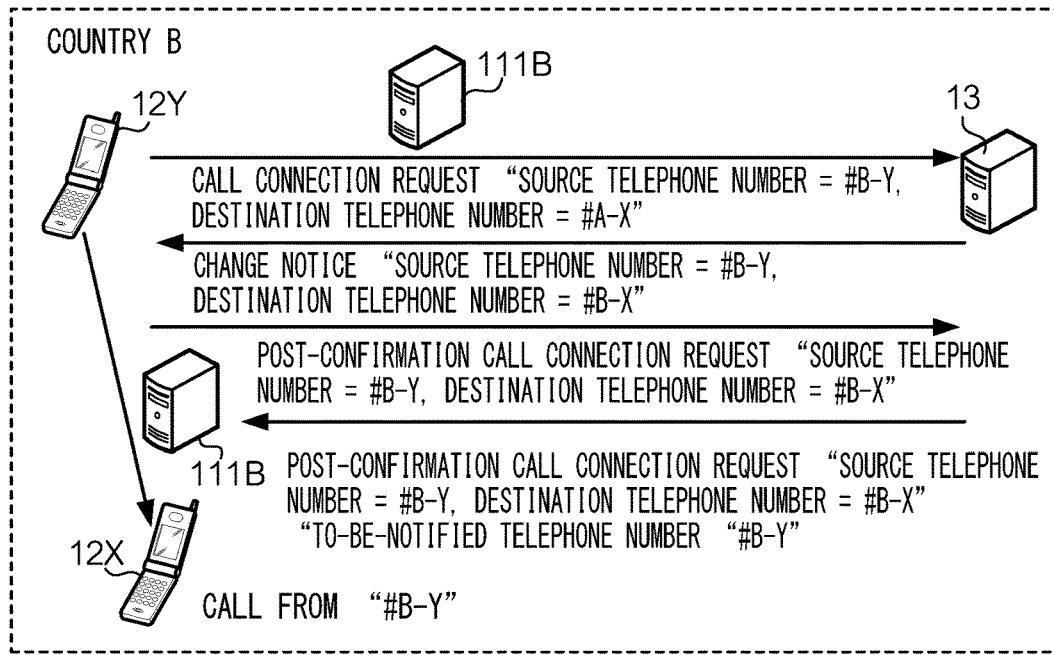
FIG. 16 is a diagram showing how a telephone number used in a call connection system according to an embodiment is changed.

FIG. 16 is a diagram showing an exemplary operation performed by call connection system 1, according to an embodiment, in which a user of telephone 12Y located in country B calls telephone 12X located in the same country. In the exemplary operation shown in FIG. 16, it is assumed telephone number #A-Y that has been assigned to telephone 12X are active, whereas telephone numbers #A-X and #I-X that have been assigned to telephone 12X are inactive. In addition, it is assumed that a user of telephone 12Y is located in country B, and that telephone numbers #B-Y and #I-Y that have been assigned to telephone 12Y are active, whereas telephone number #A-Y that has been assigned to telephone 12Y is inactive. Namely, it is assumed that telephone 12X has changed a carrier from connecting device 111A located in country A to connecting device 111B located in country B, and that telephone 12X is not able to call using a VoIP for any reason.

In the exemplary operation shown in FIG. 16, a user of telephone 12Y performs an input operation to call from telephone number #B-Y to telephone number "#A-X, so that the telephone sends a call connection request including information "calling telephone number=#B-Y, destination telephone number=#A-X" to management server device 13 via connecting device 111B. Management server device 13 that has received the call connection request, refers to tables including the destination telephone number selection condition table shown in FIG. 8, to select a destination telephone number according to the calling telephone number included in the call connection request. In the present exemplary operation, management server device 13 conforms to a third priority condition "country codes match" included in the destination telephone number selection condition table, so that the management server device selects telephone number "#B-X" as a destination telephone number.

Subsequently, management server device 13 refers to tables including the calling telephone number selection condition table shown in FIG. 9, to select a calling telephone number according to the selected destination telephone number "#B-X." In the present exemplary operation, management server device 13 conforms to second priority condition "country codes match" included in the calling telephone number selection condition table, so that the management server device selects telephone number "#B-Y" as a calling telephone number, which is the same as the calling telephone number specified in the call connection request. Management server device 13, in response to the call connection request received from telephone 12Y, including information "calling telephone number=#B-Y, destination telephone number=#A-X," sends a change notice including information "calling telephone number=#B-Y, destination telephone number=#B-X" to telephone 12Y via connecting device 111B.

Telephone 12Y that has received the change notice, prompts the user to change the destination telephone number. In the following description, it is assumed that the user of telephone 12Y has perfumed an input operation to agree to the suggestion (for example, pressing an "OK" button). Telephone 12Y that has accepted the input operation, sends a post-confirmation call connection request including information "calling telephone number=#B-Y, destination telephone number=#B-X" to management server device 13. Management server device 13 refers to tables including the to-be-notified telephone number selection condition table shown in FIG. 10, to select a to-be-notified telephone number according to destination telephone number "#B-X" specified in the post-confirmation call connection request. In the present exemplary operation, management server device 13 conforms to second priority condition "country codes match" included in the to-be-notified telephone number selection condition table, so that the management server device selects to-be-notified telephone number "#B-Y"

Subsequently, management server device 13 sends the post-confirmation call connection request including information "calling telephone number=#B-Y, destination telephone number=#B-X" to connecting device 111B, together with to-be-notified telephone number "#A-X." Connecting device 111B that has received the post-confirmation call connection request, establishes a call connection from calling telephone number "#B-Y" to destination telephone number "B-X" in accordance with the request. When doing so, connecting device 111B notifies the called telephone 12X of calling telephone number "#B-Y" that is actually being used, as a source telephone number.

According to call connection system 1 described in the foregoing, a user of telephone 12 is able to call by use of a destination telephone number, a calling telephone number, and a to-be-notified telephone number that have been properly selected. Accordingly, a set of a source telephone number and a destination telephone number that is desirable in terms of a communication charge or call quality is used to establish a call connection, so that cost reduction and improvement in call quality are realized. In addition, according to call connection system 1, a user of destination telephone 12 is notified, as a source telephone number, a telephone number that is familiar to the user, regardless of a telephone number that has been actually used for calling. Accordingly, the user of destination telephone 12 can readily identify a caller.

Modifications

Call connection system 1 described in the foregoing is merely an exemplary embodiment of the present invention; the system may be modified in various manners within the technical scope of the present invention. Exemplary modifications will be described below. It is of note that the above embodiment and two or more exemplar modifications described below may be combined.

(1) In the above embodiment, each of a destination telephone number, a calling telephone number, and a to-be-notified telephone number are selected in management server device 13; instead of this operational method, at least one of the telephone numbers may be selected in telephone 12 that sends a call connection request.

For example, in a case where a calling telephone number is selected in telephone 12, telephone 12, instead of management server device 13, includes calling telephone number selecting means 135. In addition, storage means 121 of telephone 12 stores data such as the calling telephone number selection condition table that is used by calling telephone number selecting means 135 to select a calling telephone number.

In another example, in a case where a to-be-notified telephone number is selected in telephone 12, telephone 12, instead of management server device 13, includes to-be-notified telephone number selecting means 137. In addition, storage means 121 of telephone 12 stores data such as the to-be-notified telephone number selection condition table that is used by to-be-notified telephone number selecting means 137 to select a to-be-notified telephone number.

(2) In the above embodiment, if destination telephone number selecting means 134 selects a destination telephone number that differs from that included in a call connection request, or if calling telephone number selecting means 135 selects a calling telephone number that differs from a source telephone number included in a call connection request, a user of telephone 12 that has sent the request is provided with a change notice to allow him/her to decide whether to change a telephone number Instead of this operational method, one or both of a source telephone number and a destination telephone number may automatically be changed, without allowing a user to decide whether to change the telephone number(s).

For example, in a case where destination telephone 12 is provided with only an assigned telephone number that is active, so that a user of source telephone 12 has to select the only active telephone number as a destination telephone number, management server device 13 may select the only active telephone number as a destination telephone number, without allowing the user to decide whether to change a telephone number, and may instruct connecting device 111 or VoIP server device 91 to establish a call connection.

(3) In the above embodiment, management server device 13 is a device separated from connecting device 111; instead of this system configuration, management server device 13 may be integrated with connecting device 111 of any telephone network 11. Alternatively, management server device 13 may be integrated with a gateway server device that serves as a gateway between telephone networks 11 or between telephone network 11 and Internet 9.

(4) In the above embodiment, call connection system 1 selects each of a destination telephone number, a calling telephone number, and a to-be-notified telephone number; instead of this operational method, call connection system 1 may select one or two of the telephone numbers.

(5) In the above embodiment, a user of telephone 12 that has sent a call connection request may be provided with a notice that prompts him/her to change a calling telephone number or a destination telephone number. In such a case, a user who has agreed to the suggestion to change a calling telephone number or a destination telephone number, may be billed an unexpectedly expensive communication charge. To eliminate such an event, management server device 13 may include a communication charge table that stores data on a communication charge involved in a call connection for each carrier, refer to the table to identify a communication charge involved in a call connection according to a pre-change call connection request, and a communication charge involved in a call connection according to a post-change call connection request, and notify telephone 12 of the identified communication charges. A user of telephone 12 who has been notified of the communication charges is able to decide whether to change a telephone number(s) in view of the communication charges, and in this way the user is not billed an unexpectedly expensive communication charge.

In the above modification (2), a user of telephone 12 that has sent a call connection request is not provided with any notice when a calling telephone number or a destination telephone number may automatically be changed. In such a case, to prevent a user of telephone 12 from being billed an unexpectedly expensive communication charge, management server device 13 may refer to the communication charge table to identify a communication charge involved in a call connection according to a pre-change call connection request, and a communication charge involved in a call connection according to a post-change call connection request, and upon detecting that the latter communication charge is cheaper, automatically change a calling telephone number or a destination telephone number.

In a case where management server device 13 has changed a calling telephone number or a destination telephone number with a user's approval or automatically, a user may receive a discounted communication charge. In such a case, a billing processing device that performs a billing process in cooperation with connecting device 111 or VoIP server device 91, is provided with instruction data that instructs the billing processing device to adopt a special charge, from the connecting device or the VoIP server device. The billing processing device that has received the instruction data, calculates a communication charge involved with a call connection according to a changed call connection request, at a special rate that is cheaper than a normal rate. Accordingly, a user for whom a calling telephone number or a destination telephone number has been changed by call connection system 1 with his/her approval or automatically, can receive a discounted communication charge.

(6) In the above embodiment, telephones 12 use a telephone number that is identified by a unique ID (IMSI) recorded in a SIM card, to cause connecting device 111 of a carrier that corresponds to the telephone number to establish a call connection. In addition, telephones 12 use a telephone number for VoIP (IP telephone number) to cause VoIP server device 91 to establish a call connection. However, not all telephones 12 included in call connection system 1 need to enable a call connection using an IP telephone number. Call connection system 1 may not include VoIP server device 91, in which case the system cannot enable a call connection using a VoIP. If a call connection using a VoIP cannot established, a calling telephone number, a destination telephone number, and a to-be-notified telephone number are selected from among telephone numbers that are identified by unique IDs recorded in a SIM card of telephone 12.

(7) In the above embodiment, management server device 13 that has received a call connection request from telephone 12, selects a destination telephone number according to a source telephone number included in the request (FIG. 14, step S105), and thereafter selects a calling telephone number according to the selected destination telephone number (FIG. 14, step S106). However, the order in which the telephone numbers are selected may be reversed. Alternatively, management server device 13 may include a table that stores data on conditions based on which a set of a calling telephone number and a destination telephone number is selected, instead of the destination telephone number selection condition table shown in FIG. 8 and the calling telephone number selection condition table shown in FIG. 9, in which case the management server device may select a set of telephone numbers in accordance with a condition recorded in the table.

(8) In the above embodiment, telephone 12 is a commonly used computer having a calling function, and that performs an operation in accordance with a program according to the present invention. Management server device 13 is a computer that is commonly used as a server, and that performs an operation in accordance with a program according to the present invention. In a modification, telephone 12 and management server device 13 may be dedicated devices, instead of a general-purpose machine.

What is claimed is:

1. A device comprising:
   a memory that stores instructions; and
   a processor that executes the instructions stored in the memory to:
   acquire a call connection request that requests a call connection from a source telephone number to a destination telephone number;
   select, as a calling telephone number, one of source telephone numbers that have been assigned to a source telephone that has sent the call connection request, in accordance with a condition relevant to the destination telephone number;
   compare the calling telephone number with the source telephone number of the requested call connection to determine whether the calling telephone number differs from the source telephone number of the requested call connection; and
   upon detecting that the calling telephone number differs from the source telephone number of the requested call connection, cause the source telephone to display a message prompting a user to change the source telephone number of the requested call connection to the calling telephone number.

2. A device comprising:
a memory that stores instructions; and
a processor that executes the instructions stored in the memory to:
acquire a call connection request that requests a call connection from a source telephone number to a destination telephone number;
select at least one of telephone numbers that have been assigned to a destination telephone that is identified by the destination telephone number, the selected at least one of the telephone numbers having been available at the time of the acquisition of the call connection request;
compare the selected at least one of the telephone numbers with the destination telephone number to determine whether the selected at least one of the telephone numbers differs from the destination telephone number; and
upon detecting that the selected at least one of the telephone numbers differs from the destination telephone number, cause a source telephone that has sent the call connection request to display a message prompting a user to change the destination telephone number to the selected at least one of the telephone numbers.

3. The device according to claim 2, wherein:
in a case where the selected at least one of the telephone numbers includes telephone numbers, the processor is further configured to select an available telephone number in accordance with a condition relevant to the source telephone number; and
the processor is configured to compare the selected available telephone number with the destination telephone number to determine whether the selected available telephone number differs from the destination telephone number; and
upon detecting that the selected available telephone number differs from the destination telephone number, the processor is configured to cause the source telephone that has sent the call connection request, to display a message prompting the user to change the destination telephone number to the selected available telephone number.

4. The device according to claim 3, wherein the processor is configured to perform the selection based on a communication network according to the telephone number.

5. A method comprising:
acquiring a call connection request that requests a call connection from a source telephone number to a destination telephone number;
selecting, as a calling telephone number, one of source telephone numbers that have been assigned to a source telephone that has sent the call connection request, in accordance with a condition relevant to the destination telephone number;
comparing the calling telephone number with the source telephone number of the requested call connection to determine whether the calling telephone number differs from the source telephone number of the requested call connection; and
upon detecting that the calling telephone number differs from the source telephone number of the requested call connection, causing the source telephone to display a message prompting a user to change the source telephone number of the requested call connection to the calling telephone number.

6. A method comprising:
acquiring a call connection request that requests a call connection from a source telephone number to a destination telephone number;
selecting at least one of telephone numbers that have been assigned to a destination telephone that is identified by the destination telephone number, the at least one of the telephone numbers having been available at the time of the acquisition of the call connection request; and
comparing the selected at least one of the telephone numbers with the destination telephone number to determine whether the selected at least one of the telephone numbers differs from the destination telephone number; and
upon detecting that the selected at least one of telephone numbers differs from the destination telephone number, causing a source telephone that has sent the call connection request to display a message prompting a user to change the destination telephone number to the selected at least one of the telephone numbers.

* * * * *